US008606571B1

(12) United States Patent
Every et al.

(10) Patent No.: US 8,606,571 B1
(45) Date of Patent: *Dec. 10, 2013

(54) SPATIAL SELECTIVITY NOISE REDUCTION TRADEOFF FOR MULTI-MICROPHONE SYSTEMS

(75) Inventors: Mark Every, Palo Alto, CA (US); Carlo Murgia, Sunnyvale, CA (US)

(73) Assignee: Audience, Inc., Mountain View, CA (US)

(*) Notice: Subject to any disclaimer, the term of this patent is extended or adjusted under 35 U.S.C. 154(b) by 659 days.

This patent is subject to a terminal disclaimer.

(21) Appl. No.: 12/837,340

(22) Filed: Jul. 15, 2010

Related U.S. Application Data

(60) Provisional application No. 61/325,749, filed on Apr. 19, 2010.

(51) Int. Cl.
*G10L 15/00* (2013.01)

(52) U.S. Cl.
USPC ........... 704/233; 375/285; 375/341; 381/111; 381/71.11; 381/71.6; 381/92; 381/94.3; 381/94.7; 455/456.1; 704/200.1; 704/202; 704/226; 704/246; 704/500

(58) Field of Classification Search
USPC ............ 704/233, 200.1, 226, 246, 500; 375/285, 341; 381/111, 71.11, 71.6, 381/92, 94.3, 94.7; 455/456.1
See application file for complete search history.

(56) References Cited

U.S. PATENT DOCUMENTS

| | | | | |
|---|---|---|---|---|
| 3,989,897 A * | 11/1976 | Carver | ......................... | 381/94.3 |
| 4,811,404 A * | 3/1989 | Vilmur et al. | ................ | 381/94.3 |
| 5,012,519 A * | 4/1991 | Adlersberg et al. | ........... | 704/226 |
| 5,335,312 A * | 8/1994 | Mekata et al. | ................ | 704/202 |
| 5,473,702 A * | 12/1995 | Yoshida et al. | ............... | 381/94.7 |
| 5,828,997 A * | 10/1998 | Durlach et al. | ............... | 704/233 |
| 6,138,101 A * | 10/2000 | Fujii | ............................. | 704/500 |
| 6,381,570 B2 * | 4/2002 | Li et al. | ......................... | 704/233 |
| 6,876,859 B2 * | 4/2005 | Anderson et al. | .......... | 455/456.1 |
| 7,346,176 B1 * | 3/2008 | Bernardi et al. | ................ | 381/92 |
| 7,373,293 B2 * | 5/2008 | Chang et al. | ............... | 704/200.1 |
| 7,539,273 B2 * | 5/2009 | Struckman | ..................... | 375/341 |
| 7,873,114 B2 * | 1/2011 | Lin | ............................... | 375/285 |
| 8,111,843 B2 * | 2/2012 | Logalbo et al. | ................ | 381/111 |
| 8,155,346 B2 * | 4/2012 | Yoshizawa et al. | ............. | 381/92 |
| 2006/0074693 A1 * | 4/2006 | Yamashita | ..................... | 704/500 |
| 2007/0053522 A1 * | 3/2007 | Murray et al. | ............... | 381/71.6 |
| 2007/0076896 A1 * | 4/2007 | Hosaka et al. | ............. | 381/71.11 |
| 2008/0147397 A1 * | 6/2008 | Konig et al. | .................. | 704/246 |

* cited by examiner

Primary Examiner — Michael Colucci
(74) Attorney, Agent, or Firm — Carr & Ferrell LLP

(57) ABSTRACT

The present technology provides noise reduction of an acoustic signal using a configurable classification threshold which provides a sophisticated level of control to balance the tradeoff between positional robustness and noise reduction robustness. The configurable classification threshold corresponds to a configurable spatial region, such that signals arising from sources within the configurable spatial region are preserved, and signals arising from sources outside it are rejected. In embodiments, the configurable classification threshold can be automatically and dynamically adjusted in real-time based on evaluated environmental conditions surrounding an audio device implementing the noise reduction techniques described herein.

24 Claims, 11 Drawing Sheets

SPATIAL SELECTIVITY NOISE REDUCTION TRADEOFF FOR MULTI-MICROPHONE SYSTEMS

CROSS REFERENCE TO RELATED APPLICATIONS

This application claims the benefit of U.S. Provisional Application No. 61/325,749, filed on Apr. 19, 2010, entitled "Position Suppression Tradeoff", which is incorporated by reference herein.

BACKGROUND

1. Field of the Invention

The present invention relates generally to audio processing, and more particularly to controlling adaptivity of noise reduction in an audio signal.

2. Description of Related Art

Noise reduction systems in audio devices utilizing two or more microphones typically use spatial cues to reduce noise. The spatial cues may be determined between acoustic signals received at the two or more microphones to help distinguish sources of desired signals such as speech from undesired signals such as noise.

The spatial cues can be used to derive relative physical locations of the sources, which can further help distinguish between speech and noise sources. For example, spatial constraints may be imposed using a classification threshold. Any source within a target region, which includes a reference point indicating a nominal usage position for the device, is classified as a speech source, and any source outside the target location is classified as a noise source. This allows the device to be positioned or moved slightly away from the nominal usage position during usage, whilst still rejecting most signals arising from noise sources (i.e. the signals arising from noise sources outside the target region) and simultaneously preserving signals arising from within the target region such as a desired speech source.

It is desirable to provide noise reduction techniques which can improve speech quality by optimizing robustness.

SUMMARY

The present technology provides noise reduction of an acoustic signal using a configurable classification threshold. The configurable classification threshold provides a sophisticated level of control to balance the tradeoff between positional robustness and noise reduction robustness. The configurable classification threshold corresponds to a configurable spatial region, such that signals arising from sources within the configurable spatial region are preserved, and signals arising from sources outside it are rejected. In embodiments, the configurable classification threshold can be automatically and dynamically adjusted in real-time based on evaluated environmental conditions surrounding an audio device implementing the noise reduction techniques described herein. The evaluated environmental conditions may be for example an estimated signal-to-noise ratio of a received acoustic signal. In such a case, the configurable classification threshold may provide high positional robustness in high signal-to-noise ratio conditions, and may provide high noise reduction robustness in low signal-to-noise ratio conditions. The configurable threshold may also be adjusted or set using an application program interface (API) of the audio device.

A method for controlling adaptivity of noise reduction in an acoustic signal as described herein includes receiving a primary acoustic signal at a first microphone and a secondary acoustic signal at a second microphone. The method also includes determining a spatial coefficient based on a difference or cross-correlation between the primary and secondary acoustic signals. The spatial coefficient indicates a locus of possible positions of a dominant speech or noise source relative to the first and second microphones. A component of the system is adapted based on the spatial coefficient when the spatial coefficient satisfies a configurable threshold.

This component may comprise a noise canceller or a multiplicative mask generator. The component may adapt in such a way that the energy level of a noise component outside the configurable spatial region is then reduced in the primary acoustic signal, while the energy level of speech components within the configurable spatial region are preserved in the primary acoustic signal.

A system for controlling adaptivity of noise reduction in an acoustic signal as described herein includes a first microphone to receive a primary acoustic signal, and a second microphone to receive a secondary acoustic signal. The system further includes a noise reduction module to determine a spatial coefficient based on a difference between the primary and secondary acoustic signals. The spatial coefficient indicates a locus of possible positions of a dominant speech or noise source relative to the first and second microphones. A component of the noise reduction module is adapted based on the spatial coefficient when the spatial coefficient satisfies a configurable threshold. An energy level of a noise component in the primary acoustic signal is then reduced based upon the adapted component of the noise reduction system.

A computer readable storage medium as described herein has embodied thereon a program executable by a processor to perform a method for controlling adaptivity of noise reduction in an acoustic signal as described above.

Other aspects and advantages of the present invention can be seen on review of the drawings, the detailed description, and the claims which follow.

DETAILED DESCRIPTION

Figure 1A:
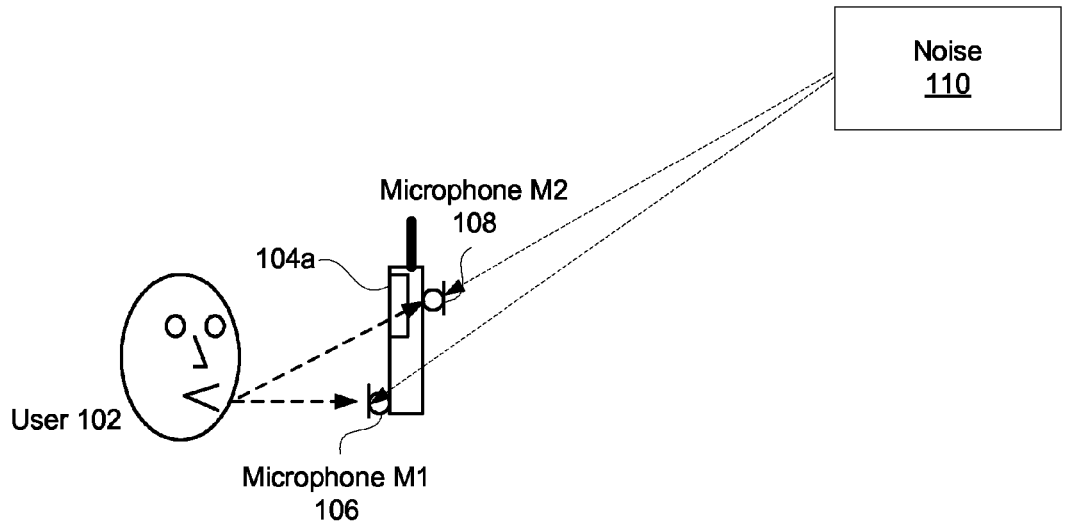
FIG. 1A is an illustration of an environment in which embodiments of the present technology utilizing a spread-microphone configuration may be used.

The present technology provides noise reduction of an acoustic signal using a configurable classification threshold which provides a sophisticated level of control to balance the tradeoff between positional robustness and noise reduction robustness. In embodiments, the configurable classification threshold can be automatically and dynamically adjusted in real-time based on evaluated environmental conditions surrounding an audio device. The adjustment may be based on estimated signal-to-noise ratio of a received acoustic signal. The configurable threshold may also be adjusted or set using an application program interface of the audio device implementing the adaptive noise reduction techniques described herein.

The configurable classification threshold defines a configurable spatial region for a microphone array, such that a source within the spatial region is classified as a speech source and any source outside the spatial region is classified as a noise source. The configurable spatial region can have a spatial volume dependent upon the evaluated environmental conditions surrounding the audio device, such as being directly proportional to an estimated signal-to-noise ratio of a received acoustic signal. In such a case, the configurable classification threshold can provide high positional robustness in high signal-to-noise ratio conditions, and provide high noise reduction robustness in low signal-to-noise ratio conditions.

A classification threshold provides a tradeoff between positional robustness (i.e. the ability to preserve a signal arising from a speech source as the device is moved away from the nominal usage position) and noise reduction robustness (i.e. the ability to reject most noise sources). The present technology provides noise reduction techniques which can optimize overall quality by balancing this tradeoff between positional robustness and noise reduction robustness.

Noise reduction techniques described herein implement the configurable classification threshold to control adaptivity of noise cancellation by determining whether or not to cancel a noise component from a primary acoustic signal received from one of two microphones. All or most of a speech component can be removed from a secondary acoustic signal received from another of the two microphones to form a noise reference signal, using a derived spatial coefficient indicating a positional orientation of the two microphones relative to a speech source. The noise reference signal is then processed or modified and can then be subtracted from the primary acoustic signal, thereby reducing the energy level of a noise component in the primary acoustic signal. This process is referred to herein as subtractive noise cancellation. Other forms of subtractive noise cancellation exist as well, such as delay-and-sum beamformer, generalized side-lobe canceller, and so forth.

The noise reduction techniques may also be utilized in multiplicative noise suppression techniques. In such a case, the configurable classification threshold may be implemented as a configurable dominance threshold used to distinguish between noise and source clusters within a cluster tracker. The result may be used to derive gain masks subsequently multiplied to the primary acoustic signal to suppress the energy level of noise. For example, the configurable threshold may provide high positional robustness by setting a relatively low dominance threshold versus ILD in high signal-to-noise ratio conditions, and may provide high noise reduction robustness by setting a relatively high dominance threshold versus ILD in low signal-to-noise ratio conditions.

Embodiments of the present technology may be practiced on any audio device that is configured to receive and/or provide audio such as, but not limited to, cellular phones, phone handsets, headsets, and conferencing systems. While some embodiments of the present technology will be described in reference to operation on a cellular phone, the present technology may be practiced on any audio device.

FIG. 1A is an illustration of an environment in which embodiments of the present technology utilizing a spread-microphone configuration may be used. A user may act as an audio (speech) source 102 to an audio device 104, which is configured as audio device 104a in FIG. 1A. The exemplary audio device 104 includes two microphones: a primary microphone 106 relative to the user 102 and a secondary microphone 108 located a distance away from the primary microphone 106. Alternatively, the audio device 104 may include more than two microphones, such as for example three, four, five, six, seven, eight, nine, ten or even more microphones.

The primary microphone 106 and secondary microphone 108 may be omni-directional microphones. Alternatively embodiments may utilize other forms of microphones or acoustic sensors.

While the microphones 106 and 108 receive sound (i.e. acoustic signals) from the user 102, the microphones 106 and 108 also pick up noise 110. Although the noise 110 is shown coming from a single location in FIG. 1, the noise 110 may include any sounds from one or more locations that differ from the location of the user 102, and may include reverberations and echoes. The noise 110 may be stationary, non-stationary, and/or a combination of both stationary and non-stationary noise.

In embodiments, spatial coefficients which indicate the positional orientation of the audio device 104 relative to the user 102 are derived based on the differences (e.g. energy and phase differences) between the acoustic signals received by the two microphones 106 and 108. Because the primary microphone 106 is much closer to the audio source 102 than the secondary microphone 108, the intensity level is higher for the primary microphone 106, resulting in a larger energy level received by the primary microphone 106 during a speech/voice segment, for example. The differences thus indicate a locus of possible locations of the mouth of the user 102 relative to the position of the primary microphone 106 and the secondary microphone 108. In alternative embodiments, the spatial coefficients may be derived using other or additional spatial cues. With more microphones, the spatial location of the mouth of the user can be determined unambiguously.

The level difference may then be used to discriminate speech and noise in the time-frequency domain. Further embodiments may use a combination of energy level differences and time delays to discriminate speech. Based on binaural cue encoding, speech signal extraction or speech enhancement may be performed.

Figure 1B:
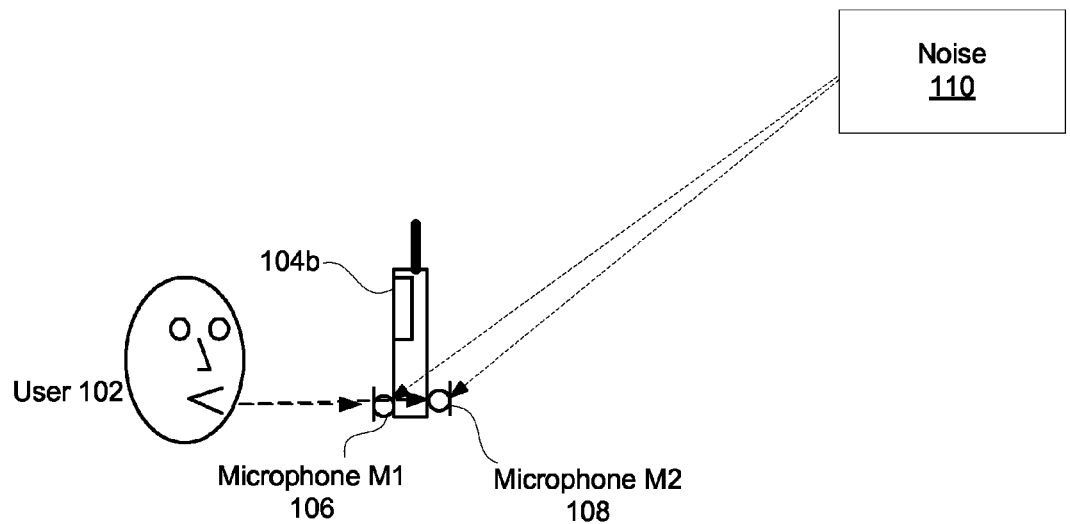
FIG. 1B is an illustration of an environment in which embodiments of the present technology utilizing a close-microphone configuration may be used.

FIG. 1B is an illustration of an environment in which embodiments of the present technology utilizing a close-microphone configuration may be used. The audio device 104, which is configured as 104b in FIG. 1B, may include a primary microphone 106 and a secondary microphone 108 that are closer together than the microphones illustrated in FIG. 1A, which are in a spread-microphone configuration. A close-microphone configuration may include microphones spaced up to four centimeters apart.

The present technology may be used with either a spread-microphone configuration or a close-microphone configuration. Hence, discussion and illustrations herein regarding either a close-microphone or spread-microphone configuration are exemplary, and are not intended to limit the present technology to one configuration.

Figure 2:
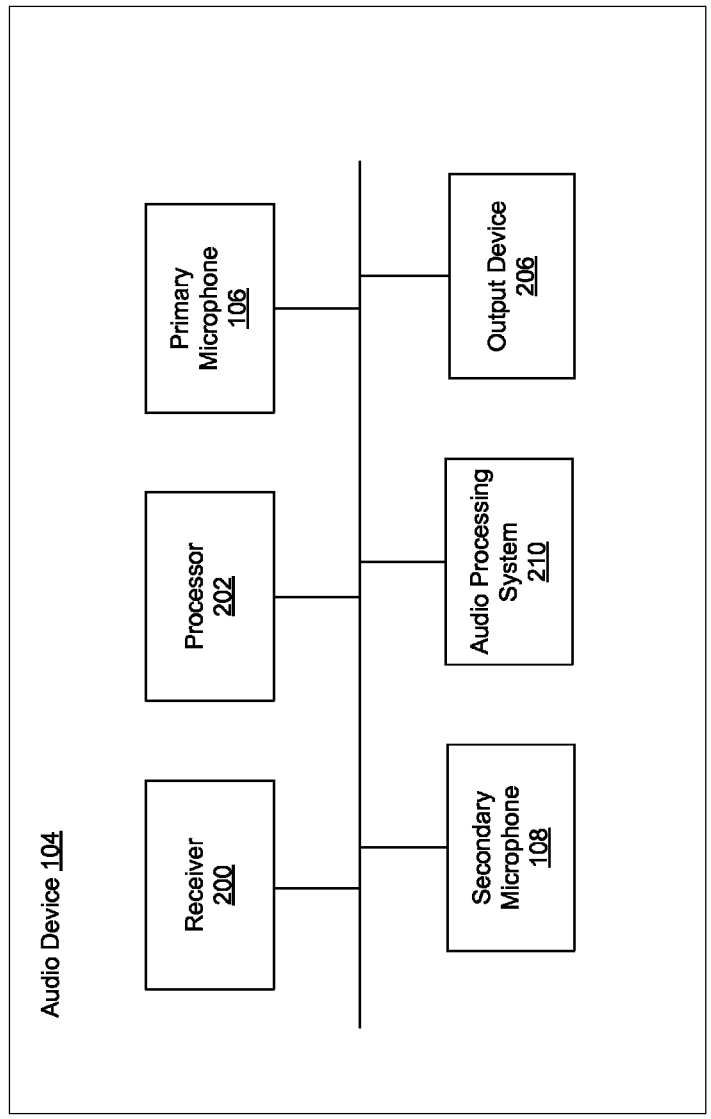
FIG. 2 is a block diagram of an exemplary audio device.

FIG. 2 is a block diagram of an exemplary audio device 104. In the illustrated embodiment, the audio device 104 includes a receiver 200, a processor 202, the primary microphone 106, a secondary microphone 108, an audio processing system 210, and an output device 206. The audio device 104 may include further or other components necessary for audio device 104 operations. Similarly, the audio device 104 may include fewer components that perform similar or equivalent functions to those depicted in FIG. 2.

Processor 202 may execute instructions and modules stored in a memory (not illustrated in FIG. 2) in the audio device 104 to perform functionality described herein, including noise reduction for an acoustic signal. Processor 202 may include hardware and software implemented as a processing unit, which may process floating point operations and other operations for the processor 202.

The exemplary receiver 200 is an acoustic sensor configured to receive a signal from a communications network. In some embodiments, the receiver 200 may comprise an antenna device. The signal may then be forwarded to the audio processing system 210 to reduce noise using the techniques described herein, and provide a noise reduced audio signal to the output device 206. The present technology may be used in the transmit path of the audio device 104.

The audio processing system 210 is configured to receive the acoustic signals from an acoustic source such as user 102 via the primary microphone 106 and secondary microphone 108, and process the acoustic signals. Processing may include performing noise cancellation within an acoustic signal as described herein. The audio processing system 210 is discussed in more detail below. The primary and secondary microphones 106, 108 may be spaced a distance apart in order to allow for detecting an energy level difference, time difference or phase difference between them. The acoustic signals received by the primary microphone 106 and the secondary microphone 108 may be converted into electrical signals (i.e. a primary electrical signal and a secondary electrical signal). The electrical signals may themselves be converted by an analog-to-digital converter (not shown) into digital signals for processing in accordance with some embodiments. In order to differentiate the acoustic signals for the purpose of clarity herein, the acoustic signal received by the primary microphone 106 is referred to as the primary acoustic signal, while the acoustic signal received from by the secondary microphone 108 is referred to as the secondary acoustic signal. The primary acoustic signal and the secondary acoustic signal may be processed by the audio processing system 210 to produce a signal with an improved signal-to-noise ratio.

The output device 206 is any device which provides an audio output to the user. For example, the output device 206 may include a speaker, an earpiece of a headset or handset, or a speaker on a conference device.

In various embodiments, where the primary and secondary microphones 106, 108 are omni-directional microphones that are closely-spaced (e.g., 1-2 cm apart), a beamforming technique may be used to simulate forwards-facing and backwards-facing directional microphones. The level difference may be used to discriminate speech and noise in the time-frequency domain which can be used in noise reduction.

Figure 3:
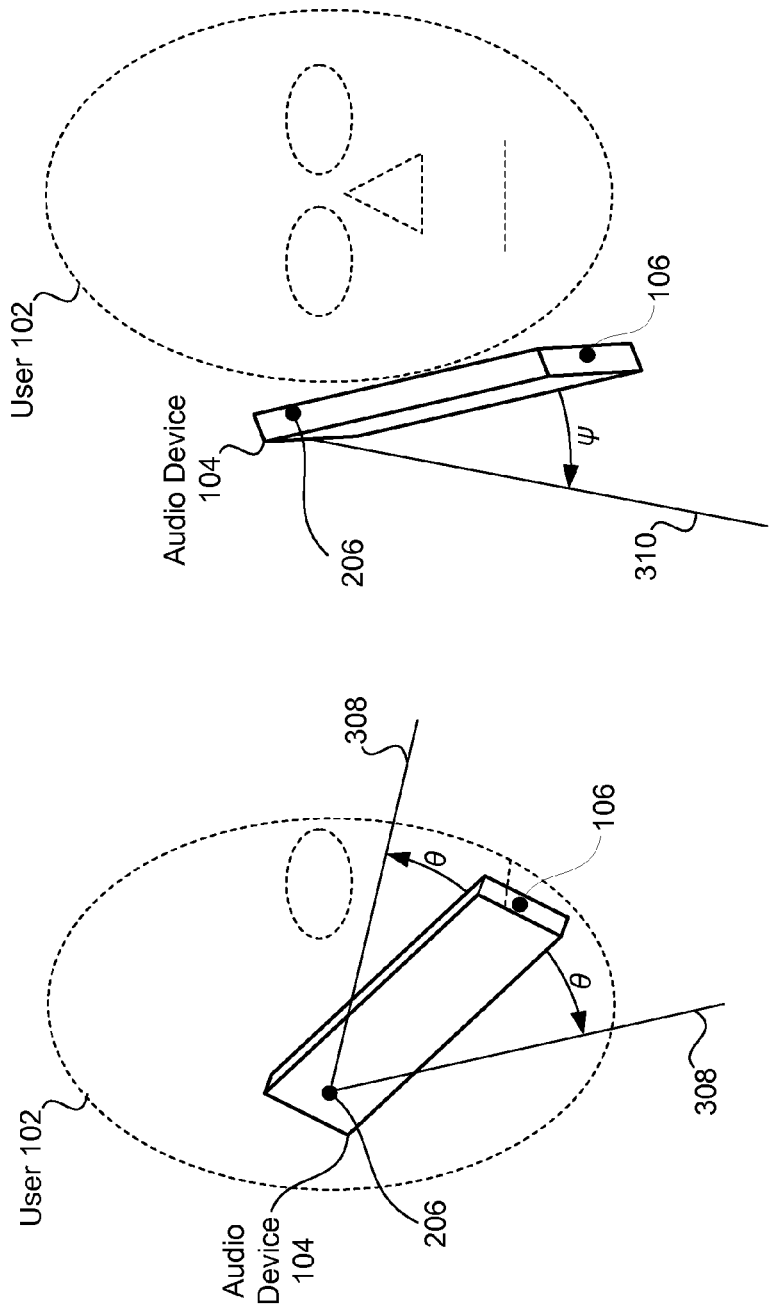
FIG. 3 illustrates an example of a nominal "close-talk" usage position for the audio device, as well as an example of variations in position from this nominal usage position.

FIG. 3 illustrates an example of a nominal "close-talk" usage position for the audio device 104. FIG. 3 also illustrates an example of variations in position from this nominal usage position during usage of the audio device 104.

In the illustrated example, the displacement of the audio device 104 from the nominal usage position relative to a speech source (user) 102 is represented by the positional range 308 and the positional range 310. As illustrated, in close-talk the audio device 104 is typically positioned such that the output device 206 (typically an earpiece or speaker) is aligned proximal to an ear of the user 102, and the primary microphone 106 is aligned proximal to the mouth of the user 102. To allow the device to be positioned or move slightly away from the nominal usage position, the positional range 308 illustrates the pivotal up and down movement roughly at the ear of the user 102 by an angle θ. The positional range 310 illustrates the pivotal outward movement roughly at the ear of the user 102 by an angle ψ.

Since the audio device 104 may be moved around as illustrated in FIG. 3, the relative physical location of the speech source 102 to each of the primary microphone 106 and the secondary microphone 108 will also change. To accommodate for this movement of the audio device 104 while also preserving the speech from the user 102 and rejecting most signals arising from noise sources, noise reduction techniques described herein impose a configurable classification threshold. The configurable classification threshold corresponds to a configurable acceptable positional range of movement for the audio device 104 relative to the user 102 or other speech source. The configurable classification threshold defines a configurable spatial region for the user 102 or other speech source relative to one or more microphones of the audio device 104. A source within the configurable spatial region is classified as a speech source, and any source outside the configurable spatial region is classified as a noise source.

The configurable spatial region can have a spatial volume dependent upon the evaluated environmental conditions surrounding the audio device 104. For example, the spatial volume may be proportional to an estimated signal-to-noise ratio of the primary acoustic signal. In such a case, the configurable classification threshold can provide high positional robustness in high signal-to-noise ratio conditions, and provide high noise reduction robustness in low signal-to-noise ratio conditions. The configurable classification threshold may also be adjusted or set using an application program interface of the audio device 104. As such, the configurable classification threshold provides a sophisticated level of control to balance the tradeoff between positional robustness and noise reduction robustness.

As described in more detail below, a spatial coefficient $\sigma(k)$ is computed based on a difference, such as an ILD and/or Inter-microphone phase difference (IPD), between the primary acoustic signal c and the secondary acoustic signal f. When the spatial coefficient $\sigma(k)$ satisfies the configurable classification threshold, thereby indicating that a speech source may be present within the corresponding spatial region, the primary acoustic signal is dominated by speech, and a spatial coefficient $\hat{\sigma}(k)$ is adapted. The spatial coefficient $\hat{\sigma}(k)$ indicates a locus of possible positional orientations of the user 102 or other speech source relative to the primary microphone 106 and the secondary microphone 108. When it is adapted during speech, the speech component of the secondary acoustic signal is optimally cancelled in the speech cancellation branch of the noise canceller, to provide a noise reference acoustic signal. When the spatial coefficient does not satisfy the configurable classification threshold, thereby indicating that a wanted speech source is not present within the corresponding spatial region, the primary acoustic signal is dominated by noise and/or echo and the spatial coefficient $\hat{\sigma}(k)$ is not adapted. Thus, the noise and/or echo component in the secondary acoustic signal is not cancelled in the speech cancellation branch of the noise canceller. A coefficient $\alpha(k)$ may then be adapted to cancel noise and/or echo from the primary acoustic signal using the noise reference acoustic signal.

Figure 4B:
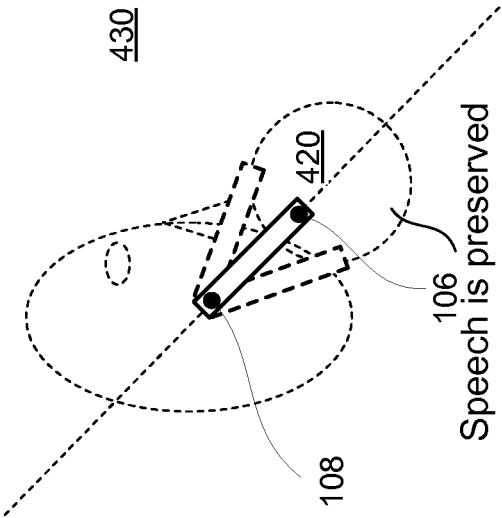
FIGS. 4A and 4B illustrate an example of the change in spatial selectivity provided by different classification thresholds.
Figure 4A:
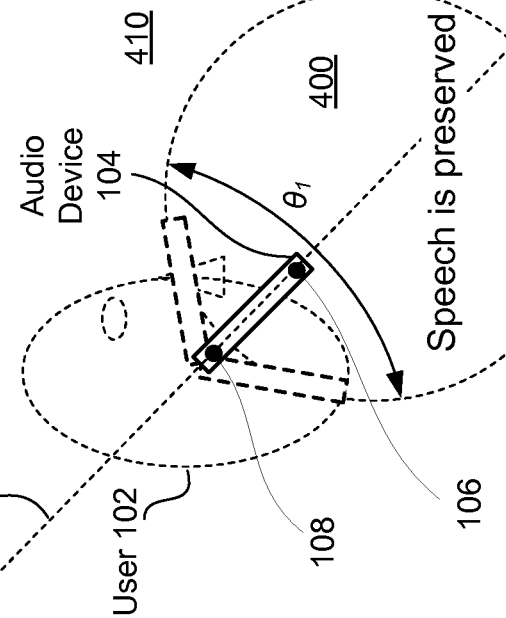

FIGS. 4A and 4B illustrate an example of the change in spatial selectivity provided by different classification thresholds. The different classification thresholds correspond to spatial regions having different spatial volumes.

FIG. 4A illustrates an example of the spatial volume of a spatial region 400 for a classification threshold which has a relatively high positional robustness and relatively low noise reduction robustness. Such a case is referred to herein as having a relatively low position-suppression tradeoff (PST). Using the noise reduction techniques described herein, the audio device 104 preserves signals arising from sources within the spatial region 400 as the audio device 104 is moved away from the nominal usage position, and rejects signals arising from sources in the region 410 outside the spatial region 400.

FIG. 4B illustrates an example of the spatial volume of a spatial region 420 for a classification threshold which has a relatively low positional robustness and relatively high noise reduction robustness. Such a case is referred to herein as having a relatively high PST. Similar to the discussion above, the audio device 104 preserves signals arising from sources within the spatial region 420, and rejects signals arising from sources within the region 430 outside the spatial region 420.

As described in more detail below, the difference in spatial volumes of the spatial regions 400 and 420 arise because of differences in the spatial constraints imposed by the two classification thresholds. As can be seen upon comparison of FIGS. 4A and 4B, the spatial volume of the spatial region 420 is less than the spatial volume of the spatial region 400. The illustration in FIGS. 4A and 4B are for a spread-microphone configuration on the audio device 104, such that the primary microphone 106 is much closer to the mouth of the user 102 than the secondary microphone 108. As a result, the level of speech in the acoustic signal received by the primary microphone 106 is much greater than that received by the secondary microphone 108. This difference in intensity level can result in a configurable spatial region having a "bubble" shape as illustrated.

Figure 5:
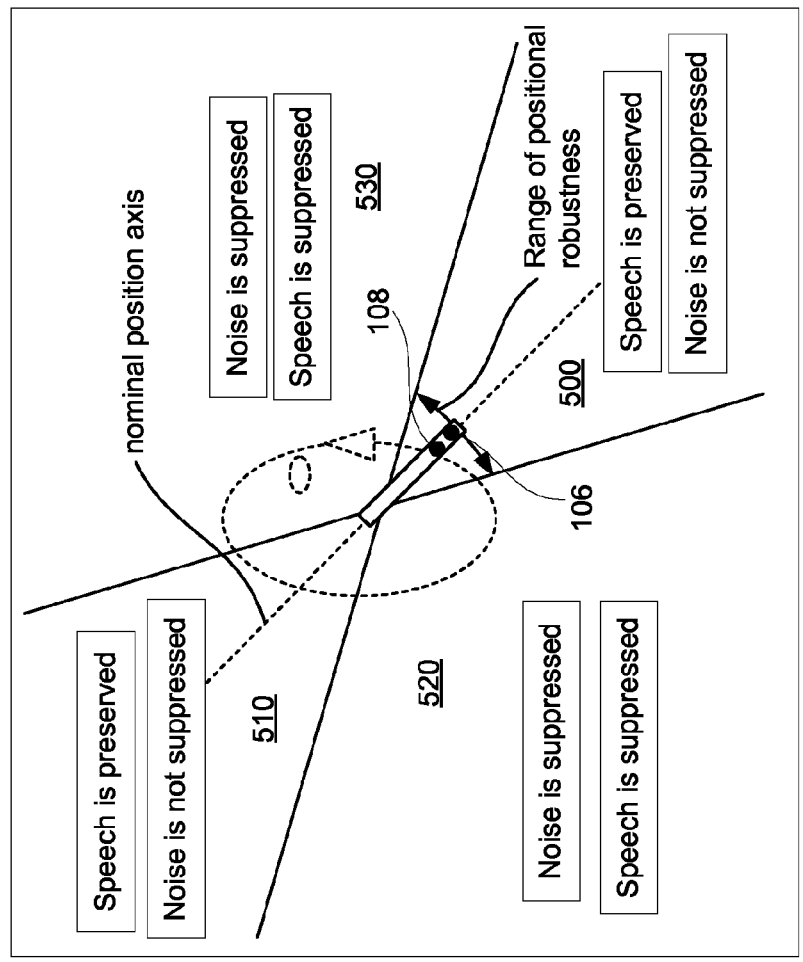
FIG. 5 illustrates an example of the spatial selectivity for a close-microphone configuration on the audio device.

FIG. 5 illustrates an example of the spatial selectivity for a close-microphone configuration (e.g., 1-2 cm apart) on the audio device 104 to provide the tradeoff between positional robustness and noise reduction robustness. For a close-microphone configuration, the level of speech received by the primary microphone 106 can be similar to that received by the secondary microphone 108. As a result, the IPD between acoustic signals received at the primary microphone 106 and secondary microphone 108 can play a greater role in determining the orientation of the audio device 104 relative to the user 102. This difference in phase can be used to define a pair of "cone-shaped" acceptable spatial regions 500 and 510. Using the noise reduction techniques described herein, the audio device 104 preserves signals arising from sources within the spatial regions 500, 510, and rejects signals arising from sources within the regions 520, 530.

Figure 6:
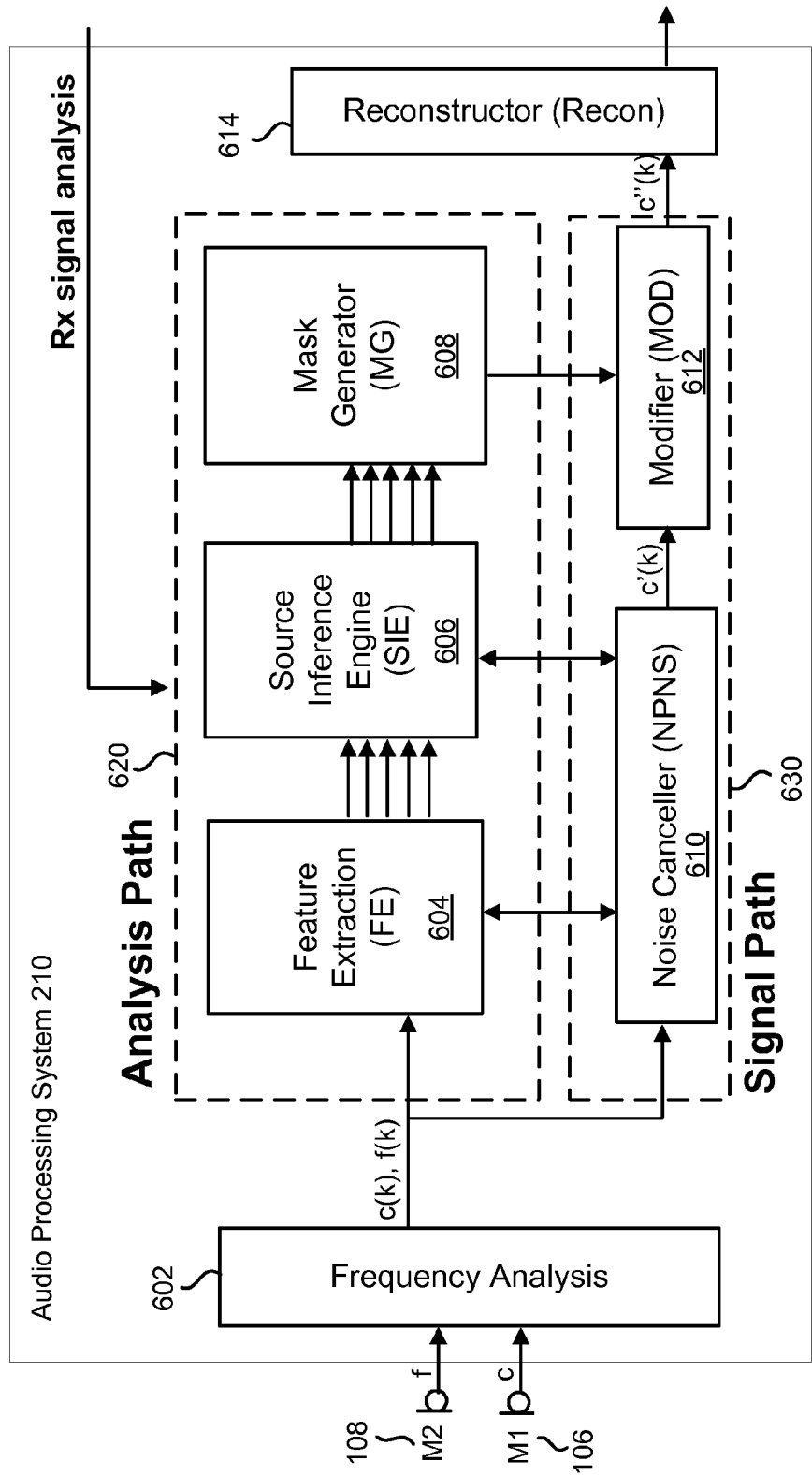
FIG. 6 is a block diagram of an exemplary audio processing system for performing noise reduction as described herein to balance the tradeoff between positional robustness and noise reduction robustness.

FIG. 6 is a block diagram of an exemplary audio processing system 210 for performing noise reduction as described herein. Audio processing system 210 may balance the tradeoff between positional robustness and noise reduction robustness. In exemplary embodiments, the audio processing system 210 is embodied within a memory device within audio device 104. The audio processing system 210 may include a frequency analysis module 602, a feature extraction module 604, source inference engine module 606, mask generator module 608, noise canceller module 610, modifier module 612, and reconstructor module 614. Audio processing system 210 may include more or fewer components than illustrated in FIG. 6, and the functionality of modules may be combined or expanded into fewer or additional modules. Exemplary lines of communication are illustrated between various modules of FIG. 6, and in other figures herein. The lines of communication are not intended to limit which modules are communicatively coupled with others, nor are they intended to limit the number of and type of signals communicated between modules.

In operation, the primary acoustic signal c received from the primary microphone 106 and the secondary acoustic signal f received from the secondary microphone 108 are converted to electrical signals, and the electrical signals are processed through frequency analysis module 602. In one embodiment, the frequency analysis module 602 takes the acoustic signals and mimics the frequency analysis of the cochlea (e.g., cochlear domain), simulated by a filter bank. The frequency analysis module 602 separates each of the primary and secondary acoustic signals c and f into two or more frequency sub-band signals. A sub-band signal is the result of a filtering operation on an input signal, where the bandwidth of the filter is narrower than the bandwidth of the signal received by the frequency analysis module 602. Alternatively, other filters such as short-time Fourier transform (STFT), sub-band filter banks, modulated complex lapped transforms, cochlear models, wavelets, etc., can be used for the frequency analysis and synthesis. Because most sounds (e.g. acoustic signals) are complex and include more than one frequency, a sub-band analysis on the acoustic signal determines what individual frequencies are present in each sub-band of the complex acoustic signal during a frame (e.g. a predetermined period of time). For example, the length of a frame may be 4 ms, 8 ms, or some other length of time. In some embodiments there may be no frame at all. The results may include sub-band signals in a fast cochlea transform (FCT) domain. The sub-band frame signals of the primary acoustic signal c is expressed as c(k), and the sub-band from signals of the secondary acoustic signal f is expressed as f(k).

The sub-band frame signals c(k) and f(k) are provided from frequency analysis module 602 to an analysis path sub-system 620 and to a signal path sub-system 630. The analysis path sub-system 620 may process the sub-band frame signals to identify signal features, distinguish between speech components and noise components, and generate a signal modifier. The signal path sub-system 630 is responsible for modifying primary sub-band frame signals c(k) by subtracting noise components and applying a modifier, such as a multiplicative gain mask generated in the analysis path sub-system 620. The modification may reduce noise and preserve the desired speech components in the sub-band signals.

Signal path sub-system 630 includes noise canceller module 610 and modifier 612. Noise canceller module 610 receives sub-band frame signals c(k) and f(k) from frequency analysis module 602. Using the techniques described herein, the noise canceller module 610 may subtract (e.g., cancel) noise components from one or more primary sub-band signals c(k). As such, noise canceller module 610 may output sub-band estimates of noise components and sub-band estimates of speech components in the form of noise-subtracted sub-band frame signals c'(k).

The total signal received by the primary microphone 106 (referred to herein as the primary acoustic signal c) may be represented as a superposition of a speech component s from the user 102, and a noise component n from noise 110. This may be represented mathematically as c=s+n. In other words, the primary acoustic signal is a mixture of a speech component and a noise component.

Due to the spatial separation of the primary microphone 106 and the secondary microphone 108, the speech component from the user 102 received by the secondary microphone 108 may have an amplitude difference and a phase difference relative to the speech component received by the primary microphone 106. Similarly, the noise component received by the secondary microphone 108 may have an amplitude difference and a phase difference relative to the noise component n received by the primary microphone 106. These amplitude and phase differences can be represented by complex coefficients. Therefore, the total signal received by the secondary microphone 108 (referred to herein as the secondary acoustic signal f) may be represented as a superposition of the speech component s scaled by a first complex coefficient 6 and the noise component n scaled by a second complex coefficient v. This can be represented mathematically as f=σs+vn. In other words, the secondary acoustic signal f is a mixture of the speech component s and noise component n of the primary acoustic signal c, where both the speech component σs and noise component vn of the secondary acoustic signal f may be independently scaled in amplitude and shifted in phase relative to those components of the primary acoustic signal c. It should be noted that a diffuse noise component d may also be present in both the primary and secondary acoustic signals c and f In such a case, the primary acoustic signal may be represented as c=s+n+d, while the secondary acoustic signal may be represented as f=σs+vn.

As described in more detail below, the noise canceller module 610 implements the configurable classification threshold to balance the tradeoff between positional robustness and noise reduction robustness. The configurable threshold is used to control adaptivity of noise cancellation by determining whether or not to adapt a coefficient that cancels the speech component, s(k), that is correlated between the two microphones. This determination is made based on a derived spatial coefficient indicating a positional orientation of the two microphones relative to a speech source. If cancellation is to be performed, all or most of a speech component can be removed from the secondary sub-band frame signals f(k) to form a noise reference signal. The noise reference signal is then processed or modified and can then be subtracted from the primary sub-band frame signals c(k) to form the noise subtracted sub-band frame signals c'(k).

The feature extraction module 604 of the analysis path sub-system 620 receives the sub-band frame signals c(k) and f(k) provided by frequency analysis module 602. Feature extraction module 604 receives the output of noise canceller module 610 and computes frame energy estimations of the sub-band frame signals, ILD and IPD between the primary acoustic signal c and the secondary acoustic signal f, self-noise estimates for the primary microphone 106 and second microphone 108, as well as other monaural or binaural features which may be required by other modules, such as pitch estimates and cross-correlations between microphone signals. The feature extraction module 604 may both provide inputs to and process outputs from noise canceller module 610.

As described in more detail, the ILD and IPD are provided to the noise canceller module 610, which uses the ILD and IPD to determine whether the spatial coefficient satisfies the configurable classification threshold.

Determining energy level estimates and inter-microphone level differences is discussed in more detail in U.S. patent application Ser. No. 11/343,524, entitled "System and Method for Utilizing Inter-Microphone Level Differences for Speech Enhancement", which is incorporated by reference herein.

Source inference engine module 606 may process the frame energy estimations to compute noise estimates and may derive models of the noise and speech in the sub-band signals. Source inference engine module 606 adaptively estimates attributes of the acoustic sources, such as their energy spectra of the output signal of the noise canceller module 610. The energy spectra attribute may be used to generate a multiplicative mask in mask generator module 608.

The source inference engine module 606 may receive the ILD from the feature extraction module 604 and track the ILD probability distributions or "clusters" of the user 102 or other speech source, background noise and optionally echo. When ignoring echo, without any loss of generality, when the source and noise ILD distributions are non-overlapping, it is possible to specify a classification boundary or dominance threshold between the two distributions, such that the signal is classified as speech if the signal-to-noise ratio is sufficiently positive or as noise if the signal-to-noise ratio is sufficiently negative. This classification may be determined per sub-band and time-frame as a dominance mask, and output by a cluster tracker module to a noise estimator module within the source inference engine module 606.

An example of tracking clusters by a cluster tracker module is disclosed in U.S. patent application Ser. No. 12/004,897, entitled "System and method for Adaptive Classification of Audio Sources," filed on Dec. 21, 2007, the disclosure of which is incorporated herein by reference.

Source inference engine module 606 may include a noise estimate module which may receive a noise/speech classification control signal from the cluster tracker module and the output of noise canceller module 610 to estimate the noise. The noise estimate determined by noise estimate module is provided to mask generator module 608. In some embodiments, mask generator module 608 receives the noise estimate output of noise cancellation module 610 and an output of the cluster tracker module, in which case a noise estimate module is not utilized.

The noise estimate module in the source inference engine module 606 may include an ILD noise estimator, and a stationary noise estimator. In one embodiment, the noise estimates are combined with a max( ) operation, so that the noise suppression performance resulting from the combined noise estimate is at least that of the individual noise estimates. The ILD noise estimate is derived from the dominance mask and NPNS module 610 output signal energy.

The mask generator module 608 receives models of the sub-band speech components and noise components as estimated by the source inference engine module 606. Noise estimates of the noise spectrum for each sub-band signal may be subtracted out of the energy estimate of the primary spectrum to infer a speech spectrum. Mask generator module 608 may determine a gain mask for the noise-subtracted sub-band frame signals c'(k) and provide the gain mask to modifier module 612. The modifier module 612 multiplies the gain masks to the noise-subtracted sub-band frame signals c'(k) to form masked sub-band frame signals c"(k). Applying the mask reduces energy levels of noise components in the sub-band signals of the primary acoustic signal and thereby performs noise reduction.

The values of the gain mask output from mask generator module 608 may be time and sub-band signal dependent and optimize noise reduction on a per sub-band basis. The noise reduction may be subject to the constraint that the speech loss distortion due to the multiplication complies with a tolerable threshold limit. The threshold limit may be based on many factors, such as for example a voice quality optimized suppression (VQOS) level. The VQOS level is an estimated maximum threshold level of speech loss distortion in the sub-band signal introduced by the noise suppression. The VQOS is tunable takes into account the properties of the sub-band signal, and provides full design flexibility for system and acoustic designers.

An example of the gain mask output from mask generator module 608 is disclosed in U.S. patent application Ser. No. 12/832,901, entitled "Method for Jointly Optimizing Noise Reduction and Voice Quality in a Mono or Multi-Microphone System," filed Jul. 8, 2010, the disclosure of which is incorporated herein by reference.

Reconstructor module 614 may convert the masked sub-band frame signals c"(k) from the cochlea domain back into the time domain. The conversion may include adding the masked sub-band frame signals c"(k) and phase shifted signals. Alternatively, the conversion may include multiplying the masked sub-band frame signals c"(k) with an inverse frequency of the cochlea channels. Once conversion to the time domain is completed, the synthesized acoustic signal may be output to the user 102 via output device 206 and/or provided to a codec for encoding.

In some embodiments, additional post-processing of the synthesized time domain acoustic signal may be performed. For example, comfort noise generated by a comfort noise generator may be added to the synthesized acoustic signal prior to providing the signal to the user. Comfort noise may be a uniform constant noise that is not usually discernible to a listener (e.g., pink noise). This comfort noise may be added to the synthesized acoustic signal to enforce a threshold of audibility and to mask low-level non-stationary output noise components. In some embodiments, the comfort noise level may be chosen to be just above a threshold of audibility and may be settable by a user. In some embodiments, the mask generator module 608 may have access to the level of comfort noise in order to generate gain masks that will suppress the noise to a level at or below the comfort noise.

The system of FIG. 6 may process several types of signals processed by an audio device. The system may be applied to acoustic signals received via two or more microphones. The system may also process signals, such as a digital Rx signal, received through an antenna or other connection.

Figure 7:
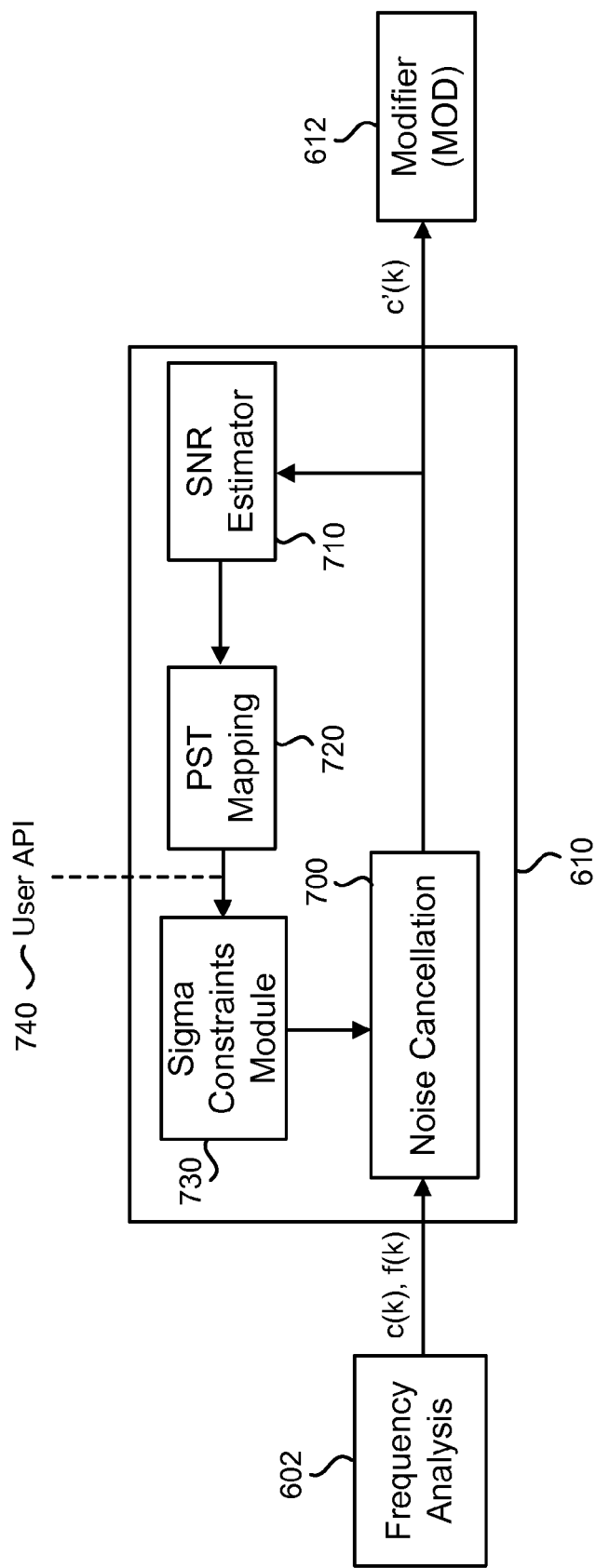
FIG. 7 is a block diagram of an exemplary noise canceller module.

FIG. 7 is a block diagram of an exemplary noise canceller module 610. The noise canceller module 610 may include a noise cancellation module 700, a signal-to-noise ratio (SNR) estimator module 710, a position-suppression tradeoff (PST) mapping module 720, and a sigma constraints module 730. Noise canceller module 610 may include more or fewer components than those illustrated in FIG. 7, and the functionality of modules may be combined or expanded into fewer or additional modules.

The noise cancellation module 700 cancels out noise components in the primary sub-band frame signals c(k) to obtain noise-subtracted sub-band frame signals c'(k). As described in more detail below with reference to FIGS. 8 and 9, the noise cancellation module 700 performs noise cancellation by adaptively applying spatial coefficients $\hat{\sigma}(k)$, subject to position-suppression tradeoff constraints imposed by sigma constraints module 730. The spatial coefficients $\hat{\sigma}(k)$ are complex values that represent a difference in amplitude and phase between the speech components in the primary sub-band frame signals c(k) and the speech components in the secondary sub-band frame signals f(k) for each sub-band. In the illustrated embodiment, the magnitude of the spatial coefficient $\hat{\sigma}(k)$ for each sub-band is the ILD for that sub-band, and the phase of the spatial coefficient $\hat{\sigma}(k)$ is the IPD.

The value of $\hat{\sigma}(k)$ may be adapted to a value that is effective in canceling the speech component s(k) of the primary sub-band frame signals c(k), subject to the positional-suppression tradeoff constraints described herein. All or most of speech components $\sigma$s(k) can then be removed from the secondary sub-band frame signals f(k) to form a noise reference signal. The noise reference signal is then processed or modified and can then be subtracted from the primary sub-band frame signals c(k) to form the noise subtracted sub-band signals c'(k). The noise cancellation module 700 is described in more detail below with respect to FIG. 9.

The signal-to-noise ratio estimator module 710 receives energy estimations of the noise components n(k) and speech components s(k) in the primary sub-band frame signals c(k) and calculates the signal-to-noise ratio per sub-band frame signal. The estimated signal-to-noise ratio per sub-band frame signal is then provided to PST mapping module 720 to determine PST parameters as described below.

In the illustrated embodiment, the signal-to-noise ratio estimator module 710 may be implemented within the noise canceller module 610 using energy estimates provided by the noise canceller module 610 as described above. Alternatively, a signal-to-ratio of the primary sub-band frame signals c(k) may be determined using stationary noise estimates and/or monaural or other cues computed by other modules in the audio processing system 210. In such a case, the signal-to-ratio does not embody dependence on the noise canceller module 610 and thus does not imply a feedback loop.

In the illustrated embodiment the signal-to-noise ratio estimator module 710 calculates instantaneous SNR as the ratio of long-term peak speech energy, $\tilde{P}_s(t,\Omega)$, to the instantaneous noise energy, $\hat{P}_n(t,\Omega)$:

$$SNR(t, \omega) \propto \frac{\tilde{P}_s(t, \omega)}{\hat{P}_n(t, \omega)}$$

$\hat{P}_s(t,\Omega)$ can be determined using one or more of mechanisms based upon the input instantaneous speech power estimate and noise power estimate $P_n(t,\Omega)$. The mechanisms may include a peak speech level tracker, average speech energy in the highest x dB of the speech signal's dynamic range, reset the speech level tracker after sudden drop in speech level, e.g. after shouting, apply lower bound to speech estimate at low frequencies (which may be below the fundamental component of the talker), smooth speech power and noise power across sub-bands, and add fixed biases to the speech power estimates and SNR so that they match the correct values for a set of oracle mixtures.

The signal-to-noise ratio estimator module 710 can also calculate a global SNR (across all sub-band signals). This may be useful in other modules within the audio processing-system 210, or may be configured as an output API of the OS for controlling other functions of the audio device 104.

The position-suppression tradeoff mapping module 720 receives the estimated signal-to-noise ratios from the signal-to-noise ratio estimator module 710, and determines PST parameters for each sub-band. As described in more detail below, the PST parameters are used by the sigma constraints module 730 to determine the spatial constraints of the configurable classification threshold. In the illustrated embodiment, the value of the PST parameter is inversely proportional to the spatial volume of the corresponding spatial region defined by the configurable classification threshold. Thus, as the value of the PST parameter increases, the corresponding spatial volume of the configurable spatial region decreases. In other words, the audio device 104 is tuned to lower positional robustness and higher noise reduction robustness. As the value of the PST parameter decreases, the corresponding spatial volume of the configurable spatial region increases. In other words, the audio device 104 is tuned to higher positional robustness and lower noise reduction robustness.

In the illustrated embodiment, the value of the PST parameter is a function of estimated signal-to-noise provided by the signal-to-noise ratio estimator module 710. As a result, the configurable spatial region can have a spatial volume proportional to an estimated signal-to-noise ratio of a received acoustic signal. In such a case, the configurable threshold can provide high positional robustness in high signal-to-noise ratio conditions, and provide high noise reduction robustness in low signal-to-noise ratio conditions.

The value of the PST parameters can be determined using a look-up table stored in memory in the audio device 104. The look-up table can be generated empirically using subjective speech quality assessment tests. Alternative techniques, such as the use of objective measures for estimating audio signal quality using computerized techniques, may also be used to generate the look-up tables in some embodiments. In alternative embodiments, the PST parameter may also be adjusted or set using an application program interface (API) 740 of the audio device 104.

The sigma constraints module 730 receives the PST parameters and computes the spatial constraints for the configurable classification threshold. As described below, the configurable classification threshold is used to determine whether to adapt $\hat{\sigma}(k)$ and perform noise cancellation on a particular sub-band primary acoustic signal c(k).

Figure 8:
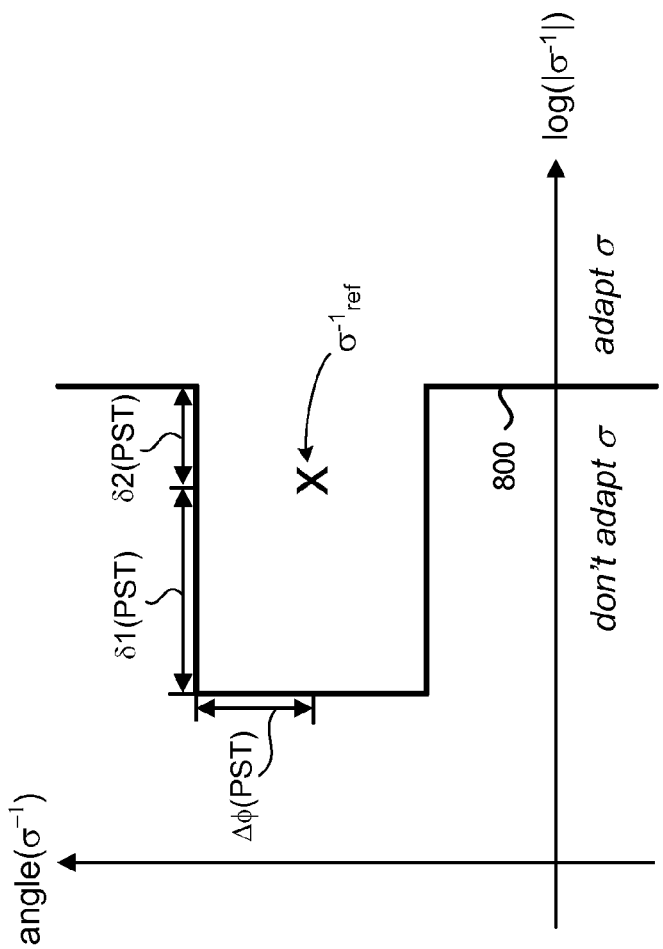
FIG. 8 illustrates an example of spatial constraints for a configurable classification boundary.

FIG. 8 illustrates an example of spatial constraints for a configurable classification boundary for a sub-band. The shape of the classification boundary may be different than that illustrated in FIG. 8. A classification boundary may be applied to a sub-set of the primary sub-band frame signals c(k), such as those having a center frequency below approximately 0.5 to 1 kHz. The x-axis in FIG. 8 denotes the ILD between the primary acoustic signal and the secondary acoustic signal, expressed as log ($|\sigma^{-1}|$), where ILD values are greater to the right and ILD values are lower to the left. Conventionally, the ILD is positive for speech since the primary microphone 106 is generally closer to the mouth of the user 102 than the secondary microphone 108. The y-axis is the angle of the complex coefficient 6 that denotes the IPD between the primary acoustic signal and the secondary acoustic signal. The 'x' marks the location of a reference value $\sigma^{-1}_{ref}$ that may be determined empirically through calibration. In the illustrated embodiment the reference value $\sigma^{-1}_{ref}$ corresponds to the nominal usage position of the audio device 104.

The reference value $\sigma^{-1}_{ref}$ may be determined empirically through calibration using a head and torso simulator (HATS). A HATS system generally includes a mannequin with built-in ear and mouth simulators that provide a realistic reproduction of acoustic properties of an average adult human head and torso. HATS systems are commonly used for in situ performance tests on telephone handsets. The audio device 104 can be mounted to a mannequin of a HATS system. Sounds produced by the mannequin and received by the primary and secondary microphones 106 and 108 can then be measured to obtain the reference value $\sigma_{ref}$. Obtaining the phase difference between the primary acoustic signal and the secondary acoustic signal can be determined by assuming that the primary microphone 106 and the secondary microphone 108 are separated by a distance d. The phase difference of a sound wave (of a single frequency) incident on the two microphones is proportional to the frequency $f_{sw}$ of the sound wave and the distance d. This phase difference can be approximated mathematically as $\phi=2\sigma f_{sw} d \cos(\beta)/c$, where c is the speed of sound and $\beta$ is the angle of incidence of the sound wave upon the primary and second microphones 106 and 108.

The configurable parameters $\Delta\phi$, $\delta 1$ and $\delta 2$ define a region labeled "adapt $\sigma$" in which the spatial coefficient $\hat{\sigma}(k)$ can be adapted and applied by the noise cancellation module 700 to perform noise cancellation. $\hat{\sigma}(k)$ is the complex prediction coefficient that determines the position of the user or speech source relative to the primary and secondary microphones, whilst $\sigma(k)$ designates the unconstrained instantaneous complex prediction coefficient (which is equivalent to ILD and IPD) between the two microphones. Thus, $\hat{\sigma}(k)$ is only adapted when $\sigma(k)$ satisfies the classification threshold defined by the parameters $\Delta\phi$, $\delta 1$ and $\delta 2$ (i.e. when $\hat{\sigma}(k)$ is to the right of line 800 in FIG. 8). Otherwise, if the spatial coefficient $\sigma(k)$ lies to the left of line 800, the spatial coefficient $\hat{\sigma}(k)$ is not adapted. The spatial coefficient $\sigma(k)$ for each sub-band is provided to the noise cancellation module 700 as described below.

The parameters $\Delta\phi$, $\delta 1$ and $\delta 2$ define the configurable spatial region for the audio device 104 relative to the user 102 or other speech source. As the values for the parameters $\Delta\phi$, $\delta 1$ and $\delta 2$ are increased, the magnitude and phase constraints for classification become broader. For example, as $\delta 1$ increases, the classification threshold allows lower ILD's to be classified as speech. Since the ILD generally decreases as the primary microphone 106 is moved away from the mouth of the user 102, a larger $\delta 1$ generally corresponds to a larger spatial volume for the configurable spatial region. Similarly, a larger $\Delta\phi$ generally allows for a larger IPD, which also corresponds to a larger spatial volume for the configurable spatial region. As a result, the corresponding spatial volume of the configurable spatial region increases, and the audio device 104 is tuned to higher positional robustness and lower noise reduction robustness.

Conversely, as the values for the parameters $\Delta\phi$, $\delta 1$ and $\delta 2$ are decreased, the magnitude and phase constraints for classification become narrower. As a result, the corresponding spatial volume of the configurable spatial region decreases, and the audio device 104 is tuned to lower positional robustness and higher noise reduction robustness.

In the illustrated example, the parameters $\Delta\phi$, $\delta 1$ may be expressed mathematically as a function of the value of the PST parameter as follows:

$$\delta_1(PST)=\delta_{min}[dB]+x[dB]\cdot(PST_{max}-PST)$$

$$\Delta\phi(PST)=\phi_{min}\cdot 2^{(PST_{max}-PST)y}$$

where x and y are constants, $PST_{max}$ is the maximum value of PST allowed, and $\delta_{min}$ and $\phi_{min}$ represent the tightest spatial magnitude and phase constraints respectively at $PST_{max}$.

In the illustrated example, the value of the PST parameter is a function of estimated SNR provided by SNR estimator module 710. For example, the PST parameters can be calibrated such that $PST=PST_{max}$ at the minimum SNR of interest, and $PST=PST_{min}$ at the maximum SNR of interest. As a result, the configurable spatial region can have a spatial volume proportional to an estimated signal-to-noise ratio of a received acoustic signal. In such a case, the configurable classification threshold can provide high positional robustness in high signal-to-noise ratio conditions, and provide high noise reduction robustness in low signal-to-noise ratio conditions.

Figure 9:
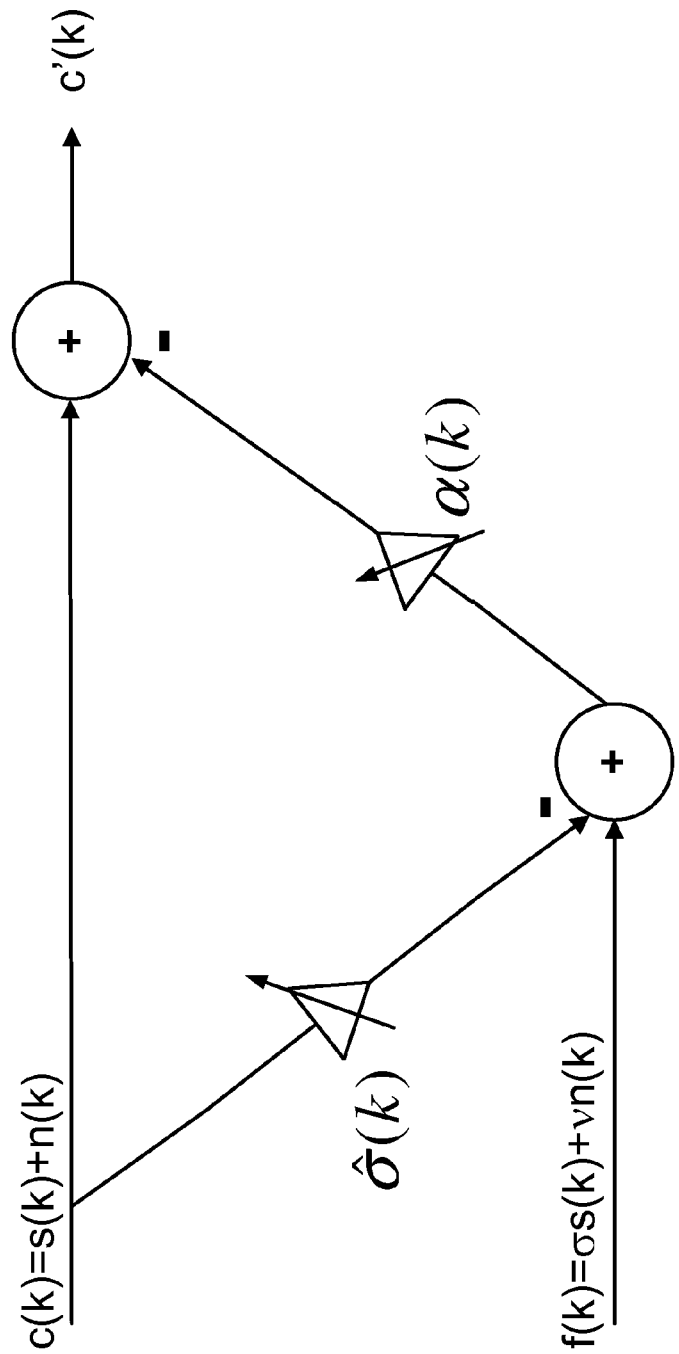
FIG. 9 is a schematic illustration of operations of a noise cancellation module in a particular frequency sub-band.

FIG. 9 is a schematic illustration of operations of the noise cancellation module 700 in a particular frequency sub-band. The primary sub-band frame signals c(k) and the secondary sub-band frame signals f(k) are inputted at the left. The schematic of FIG. 9 shows two branches. In the first branch, the primary sub-band frame signals c(k) are multiplied by the spatial coefficient $\hat{\sigma}(k)$ provided by the sigma constraints module 730. That product is then subtracted from the corresponding secondary sub-band frame signals f(k) to obtain the noise reference signal. This can be expressed as $$f(k) - \hat{\sigma} \cdot c(k) \approx f(k) - \sigma \cdot c(k) = (v - \sigma)n(k)$$

when $\hat{\sigma}(k)$, the spatial coefficient, is approximately equal to σ. The signal expressed by (v−σ)n(k) is referred to herein as the noise reference signal.

In addition to the spatial constraints imposed by the sigma constraints module 730, additional constraints for adaptation of $\hat{\sigma}(k)$ may be divided into sub-band constraints and global constraints. Sub-band constraints are considered individually per sub-band, while global constraints are considered over multiple sub-bands. Sub-band constraints may also be divided into level and spatial constraints. All constraints are considered on a frame by frame basis in exemplary embodiments. If a constraint is not met, adaptation of $\hat{\sigma}(k)$ may not be performed. Furthermore, in general, $\hat{\sigma}(k)$ is adapted within frames and sub-bands that are dominated by speech.

The coefficient α(k) is depicted in the second branch of FIG. 9. The noise reference signal (i.e., (v−σ)n(k)) is multiplied by α(k), and then that product is subtracted from the primary sub-band frame signals c(k) to obtain noise subtracted sub-band frame signals c'(k). In exemplary embodiments, the c'(k) will be dominated by the speech component received by the primary microphone 106 with minimal contribution from the noise component.

The coefficient α(k) can be adapted for changes in noise conditions in the environment such as a moving noise source, multiple noise sources or multiple reflections of a single noise source One constraint may be that the noise cancelation module 700 only adapts α when there is no speech activity. Thus, α is only adapted when $\hat{\sigma}$ is not being adapted. Another constraint is that a may adapt towards zero (i.e., no noise cancelation) if the primary signal, secondary signal, or noise reference signal (i.e., (v−σ)n(k)) is below some minimum energy threshold. In exemplary embodiments, the minimum energy threshold may be based upon an energy estimate of the primary or secondary microphone self-noise.

Figure 10:
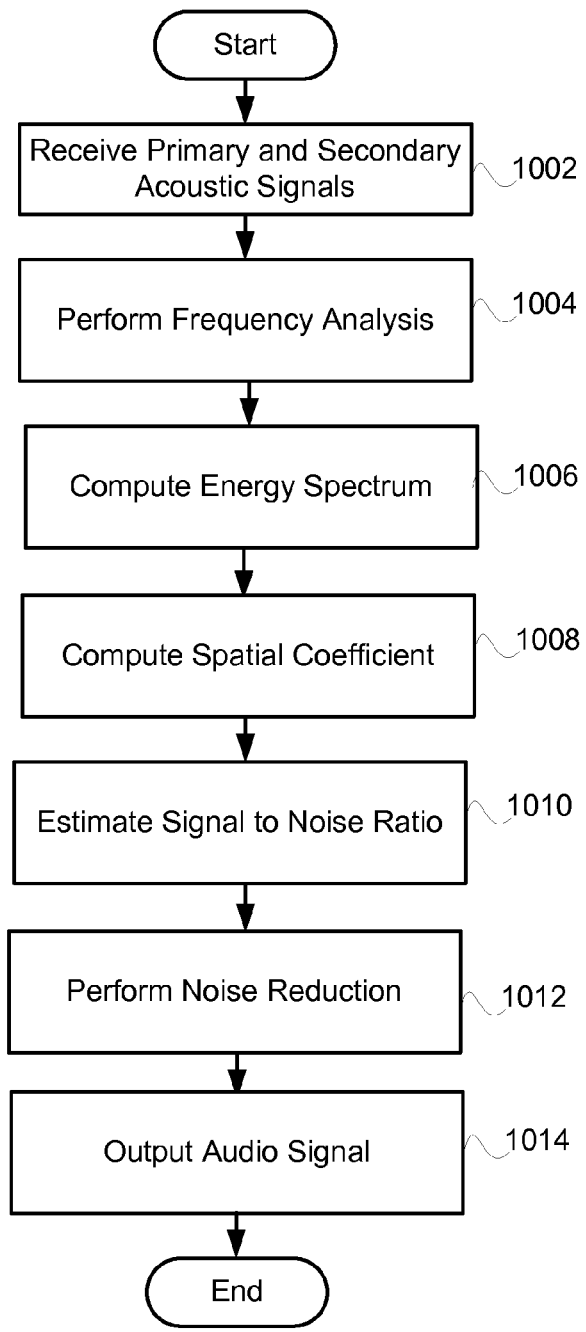
FIG. 10 is a flowchart of an exemplary method for performing noise reduction of an acoustic signal.

FIG. 10 is a flowchart of an exemplary method for performing noise reduction of an acoustic signal. Each step of FIG. 10 may be performed in any order, and the method of FIG. 10 may include additional or fewer steps than those illustrated.

In step 1002, acoustic signals are received by the primary microphone 106 and the secondary microphone 108. In exemplary embodiments, the acoustic signals are converted to digital format for processing. In some embodiments, acoustic signals are received from more or fewer than two microphones.

Frequency analysis is then performed on the acoustic signals in step 1004 to separate the acoustic signals into sub-band frame signals. The frequency analysis may utilize a filter bank to determine individual frequency bands present in the acoustic signal(s).

In step 1006, energy spectrums for the sub-band signals of the acoustics signals received at both the primary and second microphones are computed. Once the energy estimates are calculated, spatial coefficients such as ILD and IPD are computed in step 1008. As described above, the spatial coefficients indicate the positional orientation of the primary and secondary microphone 106, 108 relative to the dominant source. In one embodiment, the ILD is calculated based on the energy estimates (i.e. the energy spectrum) of both the primary and secondary acoustic signals.

The signal to noise ratio is estimated at step 1010. The SNR may be estimated by SNR estimator 710.

Noise reduction is performed at steps 1012. Noise reduction may include subtractive noise cancellation and by noise suppression which multiplies a mask with sub-band signals. Noise cancellation is performed to form the noise-subtracted sub-band frame signals c'(k) of the primary acoustic signal. An exemplary noise cancellation process is discussed in more detail below with respect to FIG. 11. Noise suppression is performed by multiplying the gain masks to the noise-subtracted sub-band signals c'(k) to form the masked sub-band frame signals c"(k).

The noise suppressed acoustic signal may then be output to the user in step 1014. In some embodiments, the digital acoustic signal is converted to an analog signal for output. The output may be via a speaker, earpieces, or other similar devices, for example.

Figure 11:
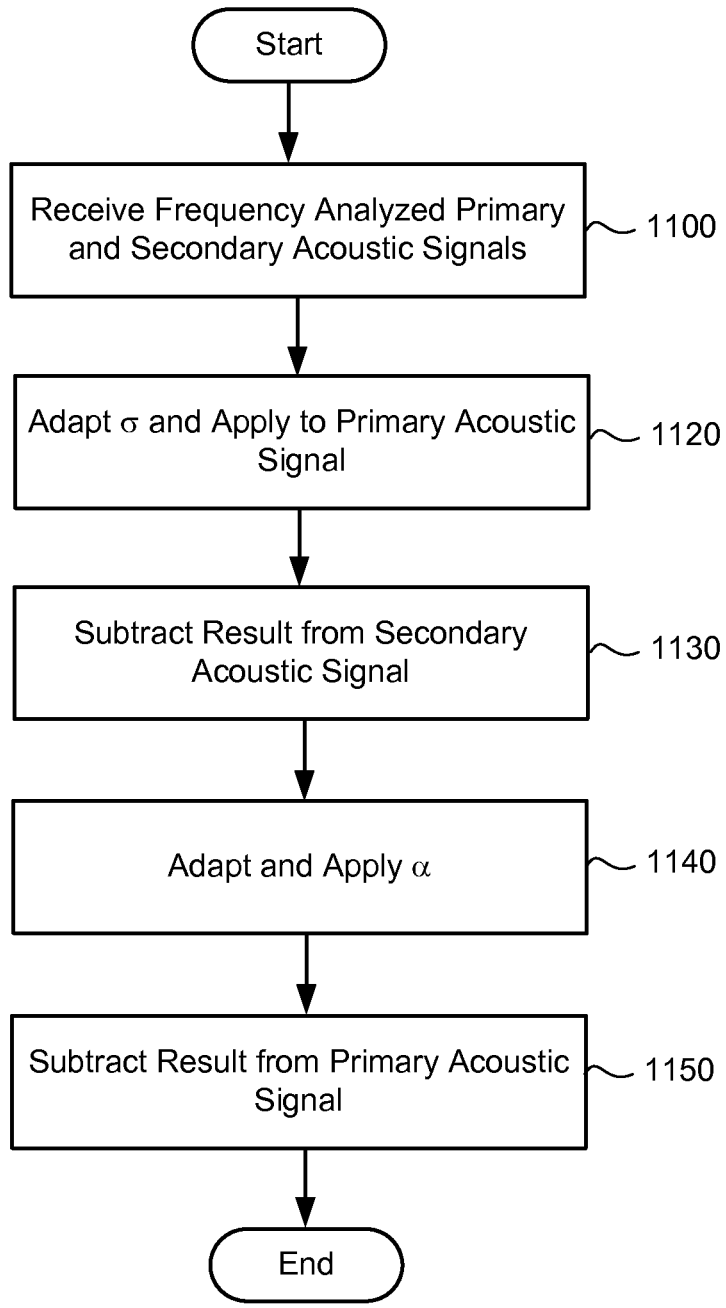
FIG. 11 is a flowchart of an exemplary method for performing noise cancellation for an acoustic signal.

FIG. 11 is a flowchart of an exemplary method for performing noise cancellation for an acoustic signal. Each step of FIG. 11 may be performed in any order, and the method of FIG. 11 may include additional or fewer steps than those illustrated.

In step 1100, the frequency analyzed primary sub-band frame signals c(k) and secondary sub-band frame signals f(k) are received. In step 1120, $\hat{\sigma}$ may be adapted and $\hat{\sigma}(k)$ is applied to the primary acoustic signal. In some embodiments, a determination may be made about the adaptation based on whether the spatial coefficient σ(k) satisfies a configurable classification threshold as described above. If the spatial coefficient σ(k) does not satisfy a configurable classification threshold, then $\hat{\sigma}(k)$ is not adapted. If the spatial coefficient σ(k) does satisfy the configurable classification threshold, then adaptation occurs.

The result of the application of $\hat{\sigma}(k)$ to the primary sub-band frame signals may then be subtracted from the secondary sub-band frame signals f(k) in step 1130 to form the noise reference signal. The noise reference signal is then processed or modified by adaptation of α(k) at step 1140. The result can then be subtracted from the primary sub-band frame signals c(k) at step 1150 to form c'(k), thereby reducing the energy level of a noise component in the primary acoustic signal.

In embodiments, the noise reduction techniques can also be utilized in multiplicative noise suppression techniques. In such a case, the configurable threshold can be implemented as a configurable dominance threshold used to distinguish between noise and source clusters within a cluster tracker, the result of which is used to derive gain masks subsequently multiplied to the primary signal to suppress the energy level of noise. For example, the configurable threshold can provide high positional robustness by setting a relatively low dominance threshold versus ILD in high signal-to-noise ratio conditions, and can provide high noise reduction robustness by setting a relatively high dominance threshold versus ILD in low signal-to-noise ratio conditions. This multiplicative noise suppression process can be carried out for example in source inference engine module 606.

The above described modules may be comprised of instructions that are stored in a storage media such as a machine readable medium (e.g., computer readable medium). These instructions may be retrieved and executed by the processor 202. Some examples of instructions include software, program code, and firmware. Some examples of storage media comprise memory devices and integrated circuits. The instructions are operational.

While the present invention is disclosed by reference to the preferred embodiments and examples detailed above, it is to be understood that these examples are intended in an illustrative rather than a limiting sense. It is contemplated that modifications and combinations will readily occur to those skilled in the art, which modifications and combinations will be within the spirit of the invention and the scope of the following claims.

What is claimed is:

1. A method for controlling adaptivity of noise reduction in an acoustic signal, the method comprising:
receiving a primary acoustic signal at a first microphone and a secondary acoustic signal at a second microphone;
determining a spatial coefficient based on a difference between the primary and secondary acoustic signals, the spatial coefficient indicating a positional orientation of the first and second microphones relative to a speech source; and
reducing an energy level of a noise component in the primary acoustic signal based on the spatial coefficient when the spatial coefficient satisfies a configurable threshold.

2. The method of claim 1, wherein the speech source is a source of speech components in the primary and secondary acoustic signals.

3. The method of claim 1, wherein the configurable threshold is based on an estimated signal-to-noise ratio of the primary acoustic signal.

4. The method of claim 3, wherein the configurable threshold defines a positional range for the first microphone relative to the speech source.

5. The method of claim 4, wherein the positional range has a spatial volume proportional to the estimated signal-to-noise ratio of the primary acoustic signal.

6. The method of claim 1, further comprising selecting the configurable threshold from a plurality of configurable thresholds.

7. The method of claim 1, wherein reducing the energy level of the noise component in the primary acoustic signal comprises multiplying the primary acoustic signal by a reduction value based on the spatial coefficient.

8. The method of claim 1, wherein reducing the energy level of the noise component in the primary acoustic signal comprises:
suppressing a speech component in the secondary acoustic signal correlated with a speech component in the primary acoustic signal based on the spatial coefficient, thereby forming a noise reference signal; and
reducing the energy level of the noise component in the primary acoustic signal based on the noise reference signal.

9. A non-transitory computer readable storage medium having embodied thereon a program, the program being executable by a processor to perform a method for controlling adaptivity of noise reduction in an acoustic signal, the method comprising:
receiving a primary acoustic signal at a first microphone and a secondary acoustic signal at a second microphone;
determining a spatial coefficient based on a difference between the primary and secondary acoustic signals, the spatial coefficient indicating a positional orientation of the first and second microphones relative to a speech source; and
reducing an energy level of a noise component in the primary acoustic signal based on the spatial coefficient when the spatial coefficient satisfies a configurable threshold.

10. The non-transitory computer readable storage medium of claim 9, wherein the speech source is a source of speech components in the primary and secondary acoustic signals.

11. The non-transitory computer readable storage medium of claim 9, wherein the configurable threshold is based on an estimated signal-to-noise ratio of the primary acoustic signal.

12. The non-transitory computer readable storage medium of claim 11, wherein the configurable threshold defines a positional range for the first microphone relative to the speech source.

13. The non-transitory computer readable storage medium of claim 12, wherein the positional range has a spatial volume proportional to the estimated signal-to-noise ratio of the primary acoustic signal.

14. The non-transitory computer readable storage medium of claim 9, further comprising selecting the configurable threshold from a plurality of configurable thresholds.

15. The non-transitory computer readable storage medium of claim 9, wherein reducing the energy level of the noise component in the primary acoustic signal comprises multiplying the primary acoustic signal by a reduction value based on the spatial coefficient.

16. The non-transitory computer readable storage medium of claim 9, wherein reducing the energy level of the noise component in the primary acoustic signal comprises:
suppressing a speech component in the secondary acoustic signal correlated with a speech component in the primary acoustic signal based on the spatial coefficient, thereby forming a noise reference signal; and
reducing the energy level of the noise component in the primary acoustic signal based on the noise reference signal.

17. A system for controlling adaptivity of noise reduction in an acoustic signal, the system comprising:
a first microphone to receive a primary acoustic signal;
a second microphone to receive a secondary acoustic signal; and
a noise reduction module to:
determine a spatial coefficient based on a difference between the primary and secondary acoustic signals, the spatial coefficient indicating a positional orientation of the first and second microphones relative to a speech source; and
reduce an energy level of a noise component in the primary acoustic signal based on the spatial coefficient when the spatial coefficient satisfies a configurable threshold.

18. The system of claim 17, wherein the speech source is a source of speech components in the primary and secondary acoustic signals.

19. The system of claim 17, wherein the configurable threshold is based on an estimated signal-to-noise ratio of the primary acoustic signal.

20. The system of claim 19, wherein the configurable threshold defines a positional range for the first microphone relative to the speech source.

21. The system of claim 20, wherein the positional range has a spatial volume proportional to the estimated signal-to-noise ratio of the primary acoustic signal.

22. The system of claim 17, wherein the noise reduction module, when executed by a processor, selects the configurable threshold from a plurality of configurable thresholds based on input received via an application program interface for the noise reduction module.

23. The system of claim 17, wherein the noise reduction module, when executed by a processor, multiplies the primary acoustic signal by a reduction value based on the spatial coefficient to reduce the energy level of the noise component in the primary acoustic signal.

24. The system of claim 17, wherein the noise reduction module, when executed by a processor, further:
- suppresses a speech component in the secondary acoustic signal correlated with a speech component in the primary acoustic signal based on the spatial coefficient, thereby forming a noise reference signal; and
- reduces the energy level of the noise component in the primary acoustic signal based on the noise reference signal.

* * * * *